US012635669B1

(12) United States Patent

Stone et al.

(10) Patent No.: US 12,635,669 B1

(45) Date of Patent: May 26, 2026

(54) FOOD DISPENSING PET TOY INCLUDING INNER AND OUTER SHELLS WITH APERTURES

(71) Applicant: Guru Pet Company, Inc., Mount Pleasant, SC (US)

(72) Inventors: John Stone, Mount Pleasant, SC (US); Amy Stone, Mount Pleasant, SC (US)

(73) Assignee: Guru Pet Company, Inc., Mount Pleasant, SC (US)

( * ) Notice: Subject to any disclaimer, the term of this patent is extended or adjusted under 35 U.S.C. 154(b) by 0 days.

(21) Appl. No.: 18/783,655

(22) Filed: Jul. 25, 2024

Related U.S. Application Data

(63) Continuation-in-part of application No. 29/882,339, filed on Jan. 13, 2023, now Pat. No. Des. 1,045,256.

(60) Provisional application No. 63/532,121, filed on Aug. 11, 2023.

(51) Int. Cl.
A01K 15/02 (2006.01)
A01K 5/01 (2006.01)

(52) U.S. Cl.
CPC .......... A01K 15/025 (2013.01); A01K 5/0114 (2013.01)

(58) Field of Classification Search
CPC ............................ A01K 5/0114; A01K 15/025
USPC ......................................................... 119/707
See application file for complete search history.

(56) References Cited

U.S. PATENT DOCUMENTS

| | | | | |
|---|---|---|---|---|
| D287,988 | S | * | 1/1987 | Billinghurst ................. D21/468 |
| D314,455 | S | | 2/1991 | Morton |

| | | | | |
|---|---|---|---|---|
| 5,343,828 | A | | 9/1994 | Houghton et al. |
| 5,351,650 | A | | 10/1994 | Graves |
| 5,819,690 | A | | 10/1998 | Brown |
| 6,098,571 | A | * | 8/2000 | Axelrod ............... A01K 5/0114 |
| | | | | 119/710 |
| 6,945,195 | B1 | * | 9/2005 | Morrison ............. A01K 15/025 |
| | | | | 119/707 |
| 7,320,296 | B2 | * | 1/2008 | Morrison ............. A01K 15/025 |
| | | | | 119/707 |
| 7,367,283 | B2 | * | 5/2008 | Aboujaoude ........ A01K 15/025 |
| | | | | 119/702 |
| 7,640,894 | B2 | | 1/2010 | Jager |
| D670,040 | S | | 10/2012 | Aboujaoude |
| D672,927 | S | | 12/2012 | Bertsch |

(Continued)

OTHER PUBLICATIONS

Our Pets Smarter Toys IQ Treat Ball—Colors Mary Vary—4" (2130010792); posted Feb. 25, 2007, retrieved Feb. 8, 2024 (online). URL: https://www.amazon.com/dp/B003ARUKTG?th=1 (year: 2007).

(Continued)

*Primary Examiner* — Brady W Frazier
(74) *Attorney, Agent, or Firm* — Standley Law Group LLP; James L. Kwak; Adam J. Smith

(57) ABSTRACT

A food dispensing pet toy includes an outer shell defining an inner void and has one or more apertures sized to accommodate kibble for passing into the inner void of the outer shell. An inner shell is located within inner void of the outer shell, defines an innermost void, and includes one or more apertures sized to accommodate the kibble for passing into the innermost void. The inner shell is independent from the outer shell such that the inner shell is freely moveable within the outer shell. Kibble may be loaded into the innermost void and be dispensed as the toy is jostled during play, thereby incentivizing the pet to continue play.

16 Claims, 6 Drawing Sheets

(56) References Cited

U.S. PATENT DOCUMENTS

| D690,057 | S | 9/2013 | Wehr | |
| D691,334 | S | 10/2013 | Byrne | |
| 8,820,268 | B2 * | 9/2014 | Valle | A01K 15/025 |
| | | | | 119/710 |
| D812,820 | S | 3/2018 | Bolter et al. | |
| D821,661 | S | 6/2018 | Burchman et al. | |
| 10,085,422 | B1 | 10/2018 | Tsengas | |
| 10,201,151 | B2 * | 2/2019 | Zhang | F21V 33/008 |
| D850,016 | S | 5/2019 | Bolter et al. | |
| 10,285,380 | B1 * | 5/2019 | Mullin | A01K 15/026 |
| 11,957,107 | B2 * | 4/2024 | Markham | A01K 15/026 |
| 2006/0254531 | A1 | 11/2006 | Willinger | |
| 2007/0068464 | A1 | 3/2007 | Smith et al. | |
| 2011/0185980 | A1 | 8/2011 | Chefetz et al. | |
| 2013/0032096 | A1 * | 2/2013 | Taylor | A01K 15/025 |
| | | | | 119/707 |
| 2017/0094943 | A1 * | 4/2017 | Wilson | A01K 15/025 |
| 2017/0202182 | A1 | 7/2017 | Bolter et al. | |
| 2021/0176956 | A1 | 6/2021 | Huang et al. | |
| 2022/0217945 | A1 | 7/2022 | Zoe | |
| 2022/0225594 | A1 * | 7/2022 | Steinkraus | A01K 15/025 |
| 2022/0287274 | A1 * | 9/2022 | Markham | A01K 15/026 |
| 2024/0016121 | A1 | 1/2024 | Wilson | |
| 2024/0373821 | A1 * | 11/2024 | Wilson | A01K 5/0114 |

OTHER PUBLICATIONS

Pet Zone IQ Treat Ball Dog Treat Dispenser Toy Ball Interactive Dog Toy—3" Dog Food Toy Stimulation, Slow Feeder; posted Aug. 26, 2016, retrieved Feb. 8, 2024 (online). URL: https://www.amazon.com/dp/B00OZOQN3U?th=1 (Year: 2016).

Monotre Dog Treat Ball, Interactive Dog Toys Treat Dispenser, Dog & Cat Puzzle Toys Active Rolling Balls Slow Feeder Toys, Dog Food Puzzle; posted Aug. 26, 2022, retrieved Feb. 8, 2024 (online). URL: https://www.amazon.com/dp/B0BBVY7269/ (Year: 2022).

Guru Duo Ball; posting date unavailable, retrieved Feb. 8, 2024 (online). URL: https://gurupetcompany.com/collections/occupy/products/guru-duo-ball (Year: 2024).

* cited by examiner

FOOD DISPENSING PET TOY INCLUDING INNER AND OUTER SHELLS WITH APERTURES

CROSS-REFERENCE TO RELATED APPLICATIONS

This application is a continuation-in-part of U.S. application Ser. No. 29/882,339 filed Jan. 13, 2023, this application also claims the benefit of U.S. Application Ser. No. 63/532,121 filed Aug. 11, 2023, the disclosures of each of the foregoing are hereby incorporated by reference as if fully restated herein.

TECHNICAL FIELD

Exemplary embodiments relate generally to pet toys which dispense food, such as kibble.

BACKGROUND AND SUMMARY OF THE INVENTION

Pets and other animals need stimulation and play to remain healthy. A variety of pet toys are known. A variety of pet food, such as kibble, are known. However, some pets are reluctant to play with certain toys or consume certain food for a variety of reasons, not all of which are entirely well understood. What is needed are pet toys which dispense food during play.

A pet toy which dispenses food, such as kibble, during play is provided. The toy may include an outer shell and an inner shell. The inner shell may be independently movable within the outer shell. The inner shell may include one or more apertures. The outer shell may include one or more apertures. The inner shell may be filled with food, such as by aligning at least one set of holes in the inner and outer shells. As the toy is played with, food may be dispensed through the hole(s) of the inner shell into a space between the outer shell and the inner shell. As the toy is further played with, food within the outer shell may be dispensed through the hole(s) of the outer shell and thereby out of the toy. Or, where the hole(s) are sufficiently aligned, kibble may be dispensed directly out of the toy from a void within the inner shell by way of the aligned hole(s). Preferably, the inner and outer shell are generally spherical in shape, though other shapes may be utilized. The hole(s) of the inner shell may include tabs, such as to limit food dispensing.

The toy may include a singular outer shell and inner shell. The toy may, alternatively or additionally, include a singular outer shell with multiple inner shells, each with their own hole(s). In exemplary embodiments, the outer shell is generally shaped as two joined spheres, and the inner shells are each spherical in shape, though other shapes may be utilized.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

Figures 3, 4:
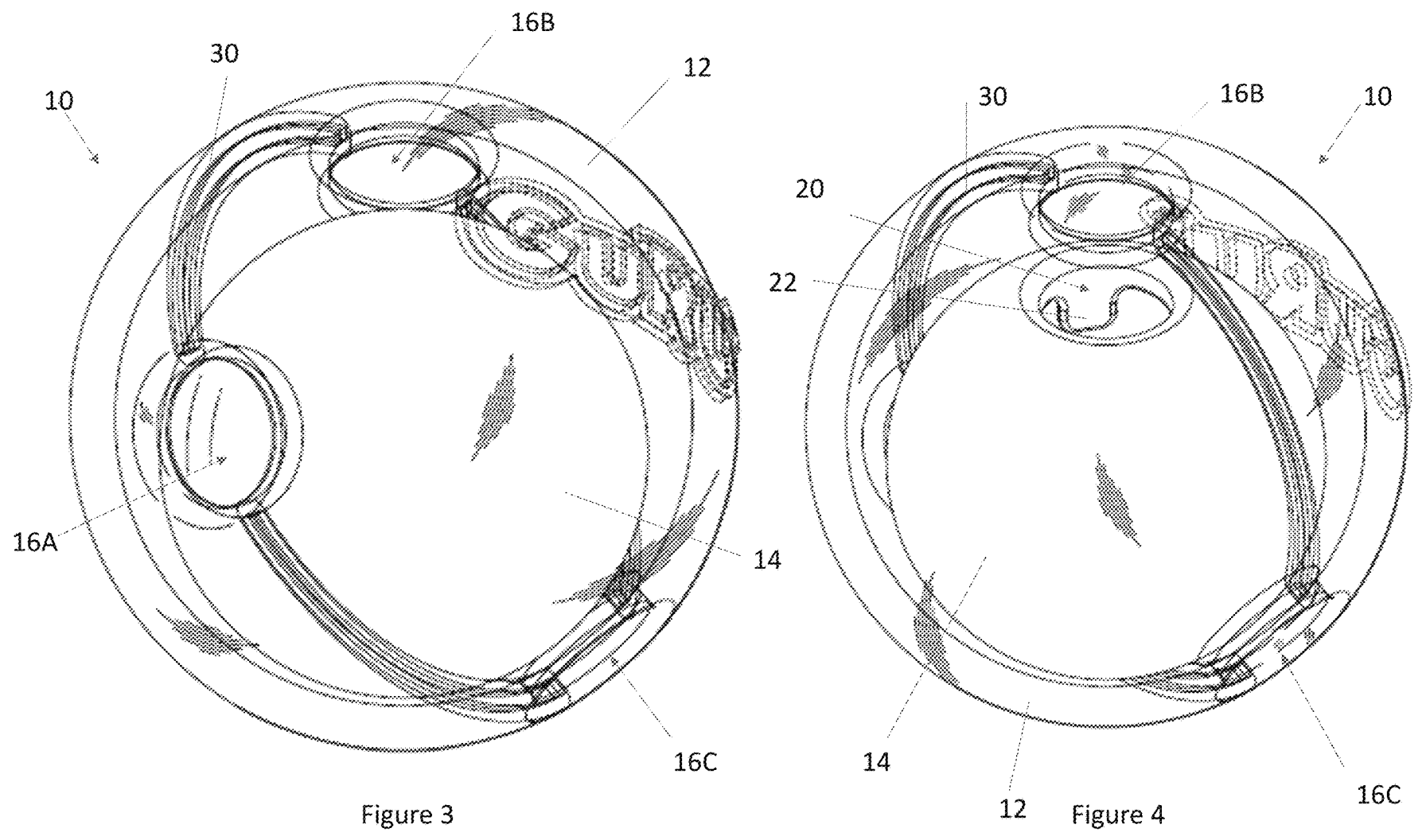

FIG. 3 is a perspective view of the pet toy of FIG. 1;

FIG. 4 is another perspective view of the pet toy of FIG. 1;

DETAILED DESCRIPTION OF EXEMPLARY EMBODIMENT(S)

Figure 1:
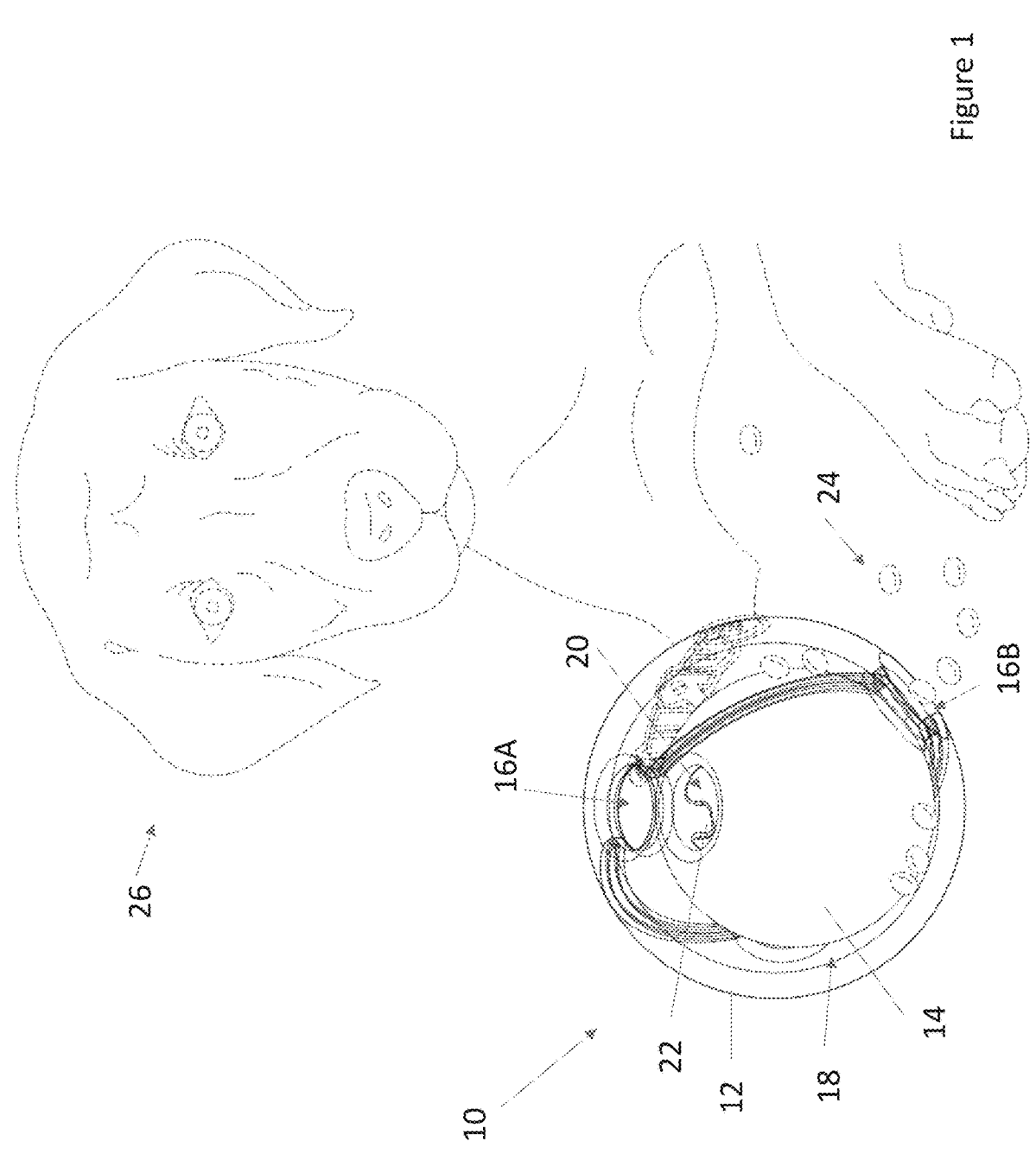
FIG. 1 is perspective view of an exemplary food dispensing pet toy in exemplary use.
Figure 2:
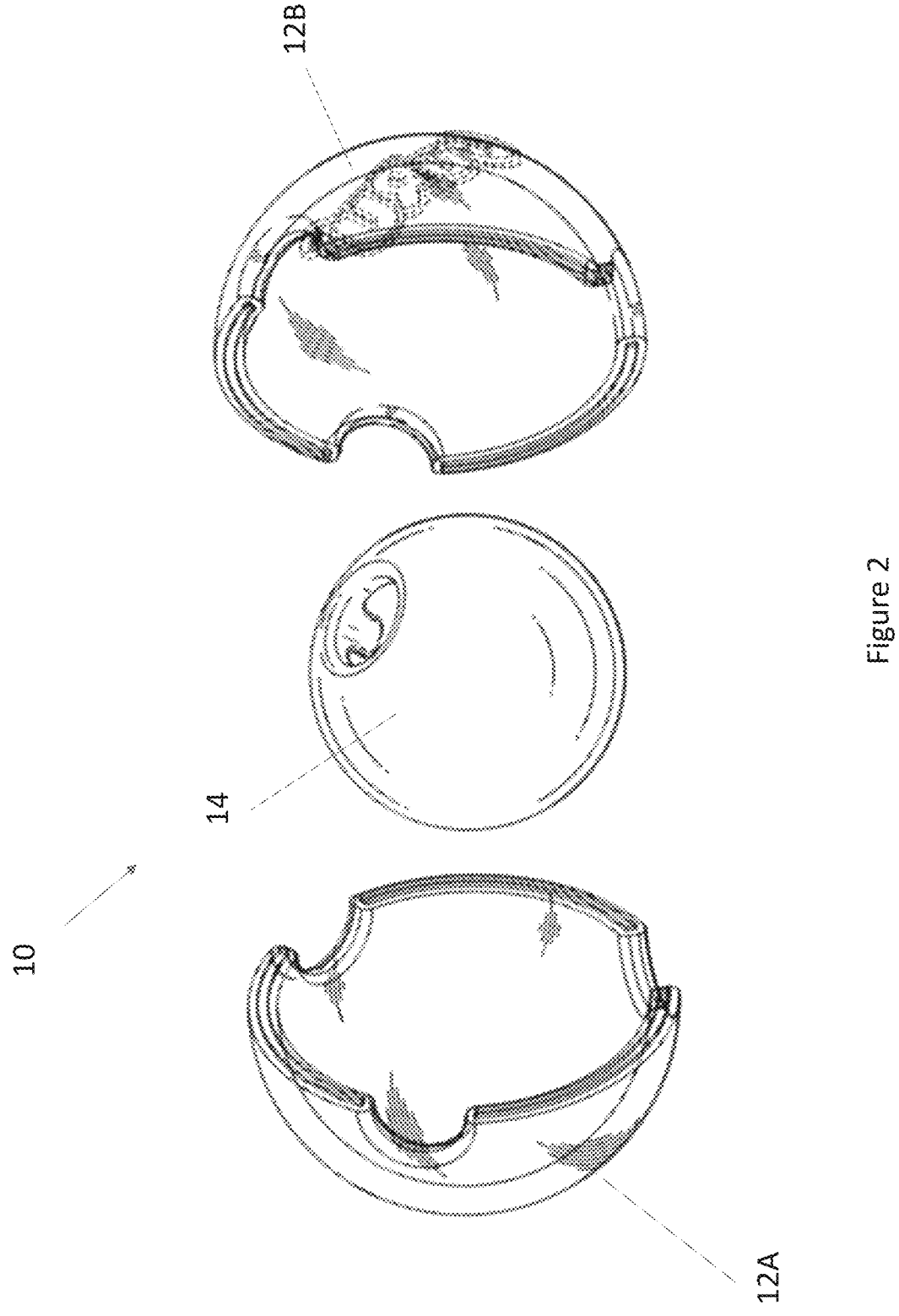
FIG. 2 is an exploded view of the pet toy of FIG. 1.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

FIG. 1 through FIG. 4 illustrate an exemplary pet toy 10. The pet toy 10 may comprise an outer shell 12 and an inner shell 14. The inner shell 14 may be nested within the outer shell 12. The inner shell 14 and the outer shell 12 may be generally spherical in shape in exemplary embodiments, without limitation. Other shapes may be utilized. The inner shell 14 may be located within, but otherwise detached from, the outer shell 12 so that the inner shell 14 may otherwise move freely within the outer shell 12. In this fashion, the inner shell 14 may be independent from the outer shell 12. The outer shell 12 may be hollow, such as to provide a void 18 to accommodate the inner shell 14. When installed, a void may remain between at least portions of the inner shell 14 and the outer shell 12. For example, portions of the inner shell 14 may rest against portions of the outer shell 12, such as due to gravitational forces. The inner shell 14 may be hollow, such as to provide another, innermost void within the inner shell 14, such as for storing food 24. The food 24 may include kibble, treats, food pellets, combinations thereof, or the like of various kinds and/or types.

In exemplary embodiments, without limitation, the outer shell 12 may include multiple pieces, such as two halves 12A, 12B. The pieces 12A, 12B may be connectable together, such as by snap or other friction fit, interference fit and/or are permanently connected by heat welding, sonic welding, thermal bonding, adhesive, combinations thereof, or the like, preferably along a circumferentially extending seam 30, such as extending along the great circle of the outer shell 12 when joined. In exemplary embodiments, without limitation, a protrusion may be provided at a first half 12A of the outer shell 12 with a corresponding, mating recess provided at a second half 12B of the outer shell 12 to align the halves 12A, 12B along the seam 30, though such is not necessarily required. The outer shell 12 may comprise one or more apertures 16, such as three apertures 16A, 16B, 16C. The aperture(s) 16 may be spaced apart about the outer shell 12, such as but not limited to, along the great circle thereof. The halves 12A, 12B of the outer shell 12 may be divided along the apertures 16 in exemplary embodiments, without limitation. Stated another way, the seam 30 may extend through some or all of the apertures 16. The aperture(s) 16 may be equally spaced. The aperture(s) 16 may be generally circular in shape. Any number, size, shape, arrangement, and/or location of the apertures 16 may be utilized.

The inner shell 14 may comprise a normally indivisible object. The inner shell 14 may be shaped as a hollow sphere, though other shapes may be utilized. The inner shell 14 may comprise a single aperture 20, though any number, size, shape, and/or location of the apertures 20 may be utilized. The aperture 20 may be circular in shape. The aperture 20 may comprise one or more tabs 22. The tab(s) 22 may extend inward from the aperture 20. The tabs 22 may resist and/or selectively prevent dislodgement of food 24 located within the inner shell 14. In exemplary embodiments, the aperture 20 may comprise three tabs 22, preferably equally spaced about the aperture 22. The tabs 22 may be generally rectangular in shape. Any number, size, shape, arrangement, and/or type of tabs 22 may be utilized.

The inner shell 14 may be movable relative to the outer shell 12. For example, as the outer shell 12 is moved by a pet 26, such as in play, the inner shell 14 may be jostled, and pet food 24 may be periodically dispensed into the void 18 between the inner shell 14 and the outer shell 12. Preferably, the inner shell 14 is independently movable within the outer shell 12. The size and shape of the void 18 may change as the inner shell 14 is moved relative to the outer shell 12. As the outer shell 12 is moved, the pet food 24 may be dispensed out of the toy 10 by way of one or more of the apertures 16 and/or 20. This may encourage the pet 26 to continue playing with the toy 10. Advantageously, the dispensing of pet food 24 may be somewhat, or wholly, random due to the nature of the toy 10, including, but not necessarily limited to, due to offset of the apertures 16 and 20. This may increase the desire for the pet 26 to continue to play with the toy 10. The outer shell 12 may be disassembled to load the inner shell 14 with additional pet food 24, such as into the aperture 20 of the inner shell 14, and reassembled for play. Alternatively, or additionally, the pet food 24 may be loaded by manually aligning the aperture 20 of the inner shell 14 with one of the aperture(s) 16 of the outer shell 12 and depositing the pet food 24. This technique may be utilized, for example without limitation, where the outer shell 12 is not readily capable of being disassembled (e.g., welded together or otherwise permanently attached). The tab(s) 22 may be provided to allow dispensing some pet food 24 upon certain movements and/or vigorous play. Alternatively, or additionally, the pet food 24 may be loaded into the void 18 between the outer shell 12 and the inner shell 14.

The outer shell 12 may be partially or wholly transparent. The outer shell 12 may comprise one or more polymers and/or elastomers, rubbers, silicone, combinations thereof, or the like. The inner shell 14 may be partially or wholly opaque. The inner shell 14 may comprise one or more polymers and/or elastomers, rubbers, silicone, combinations thereof, or the like. Various levels of transparency/opacity may be utilized for various components of the toy 10. The outer shell 12 and/or the inner shell 14 may be formed from one or more silicones, thermoplastic elastomers (TPE), plastics, combinations thereof, or the like.

Figure 5:
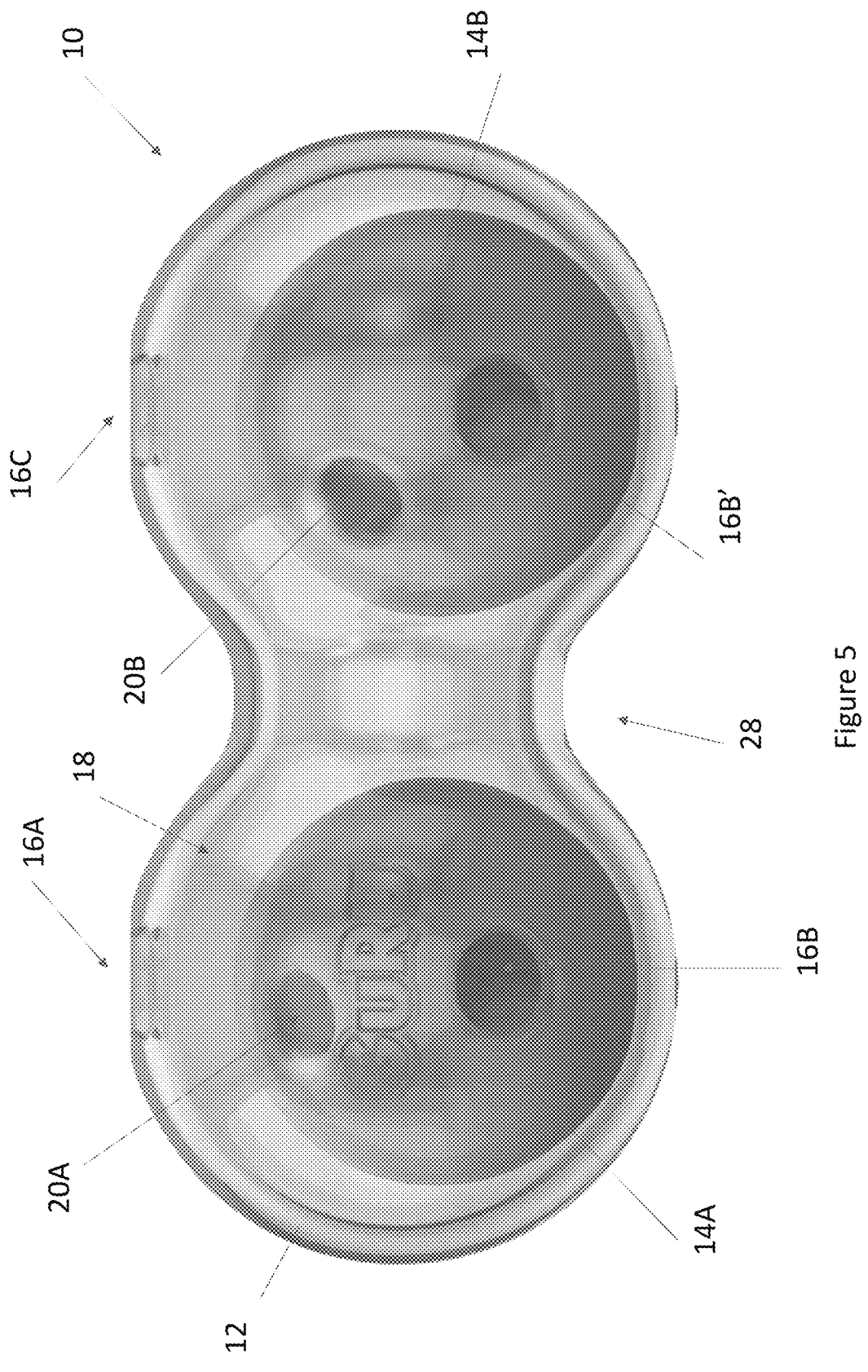
FIG. 5 is a front view of another exemplary embodiment of a food dispensing pet toy.
Figure 6:
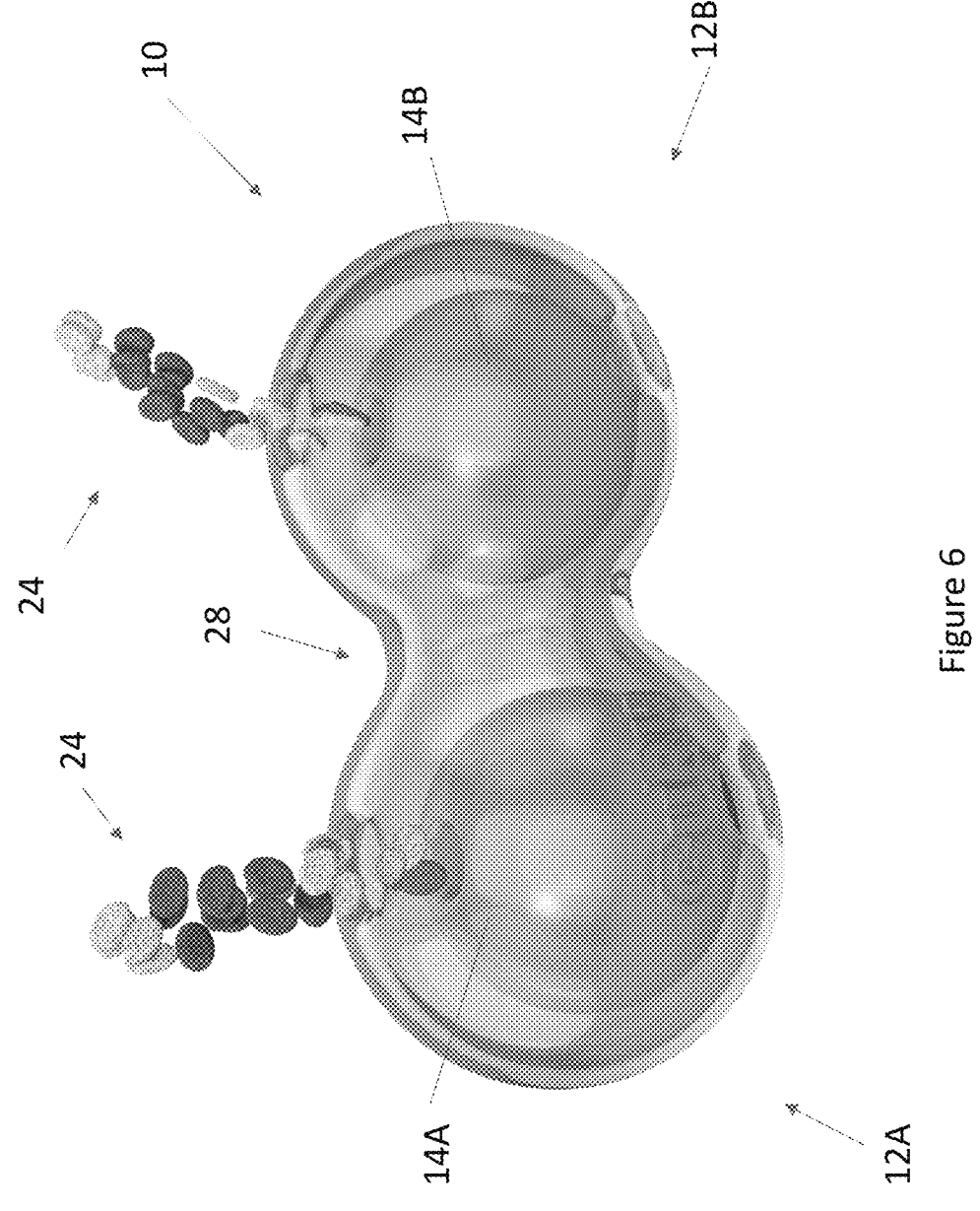
FIG. 6 is a perspective view of the pet toy of FIG. 5 in exemplary use.
Figure 7:
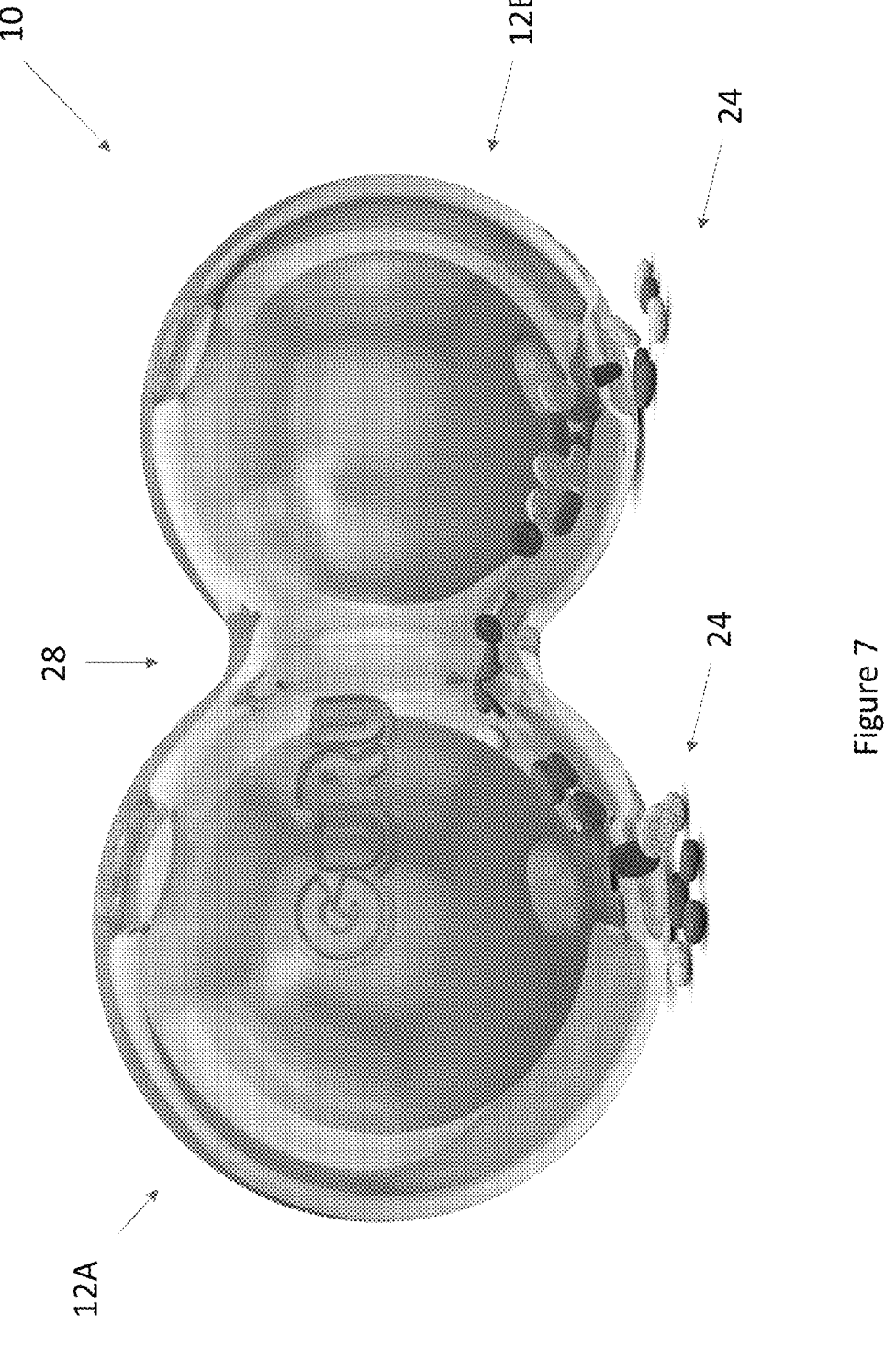
FIG. 7 is another perspective view of the pet toy of FIG. 5 in other exemplary use.

FIG. 5 through FIG. 7 illustrates another exemplary embodiment of the pet toy 10. The outer shell 12 may be configured to accommodate multiple inner shells 14. The outer shell 12 may be generally shaped as two joined spheres to accommodate two, generally spherical inner shells 14A, 14B, one in each portion of the outer shell 12, by way of non-limiting example. Any number, size, shape, and/or the like of the inner shells 14 may be provided with an accordingly shaped outer shell 12. The outer shell 12 may be configured to maintain the inner shells 14 in separate spaces, such as by way of one or more channels 28, which may connect the portions of the outer shell within a depressed area of the outer shell 12 but which is sized to prevent movement of the inner shells 14 though the channel 28. Barriers, protrusions, or the like may alternatively, or additionally, be provided within, or in lieu of, the channels 28. Contact may be permitted, or alternatively, prevented, between the inner shells 14 by the nature the outer shell 12 (e.g., barriers, protrusions, combinations thereof, or the like). Each of the inner shells 14 may comprise a same or different number, size, shape, type, and/or arrangement of holes 20. Each portion of the outer shells 12 may comprise a same or different number, size, shape, type, and/or arrangement of holes 16. The portions of the outer shells 12 and the inner shells 14 may be shaped, sized, arranged, or the like the same or different from one another.

As illustrated with particular regard to FIGS. 6-7, food 24 may be independently loaded into each of the inner shells 14A, 14B, such as by way of the hole(s) 16 in the outer shell portions 12A, 12B and independently dispensed, such as through play with the toy 10. The outer shell 12 may be joined such that food 24 may extended between the portions 12A, 12B thereof and/or in and/or out of the hole(s) 16 therein and/or the inner shells 14A, 14B. However, in other embodiments, the portions 12A, 12B may be separated, such as by a barrier so that food 24 may not move therebetween. Stated another way, the void 18 may be common to both portions 12A, 12B of the outer shell 12, or two separate voids 18 may be provided.

Any type or kind of food 24 may be utilized, with or for any type or kind of animal.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

What is claimed is:

1. A food dispensing pet toy comprising:
an outer shell defining an inner void and comprising one or more apertures sized to accommodate kibble for passing into the inner void of the outer shell;
an inner shell located within the inner void of the outer shell, defining an innermost void, and comprising one or more apertures sized to accommodate the kibble for passing into the innermost void; and tabs extending inward from at least one of the one or more apertures of the inner shell into the innermost void;

wherein the inner shell is detached from the outer shell and freely moveable within the outer shell.

2. The food dispensing pet toy of claim 1 wherein:

the one or more apertures of the outer shell comprise a plurality of apertures; and the one or more apertures of the inner shell consist of a single aperture.

3. The food dispensing pet toy of claim 1 wherein:

the tabs comprise three, evenly spaced apart tabs.

4. The food dispensing pet toy of claim 1 wherein:

the outer shell is spherical in shape; and the inner shell is spherical in shape.

5. The food dispensing pet toy of claim 4 wherein:

the outer shell comprises two halves joined along a seam extending along a circumference of the outer shell; and the seam extends through each of the plurality of apertures of the outer shell such that a portion of each of the plurality of apertures is located on each of the halves.

6. The food dispensing pet toy of claim 5 wherein:

the plurality of apertures of the outer shell are evenly spaced apart along the great circle of the outer shell.

7. The food dispensing pet toy of claim 5 wherein:

the outer shell and the inner shell are formed from thermoplastic elastomer and the halves of the outer shell are joined by heat welding along the seam.

8. The food dispensing pet toy of claim 7 wherein:

the inner shell is integrally formed as a unitary object.

9. The food dispensing pet toy of claim 1 further comprising:

a second inner shell located within the inner void of the outer shell, defining an innermost void, and comprising one or more apertures sized to accommodate the kibble for passing into the innermost void of the second inner shell.

10. The food dispensing pet toy of claim 9 wherein:

the outer shell comprises a dumbbell shape such that the inner void defines a first spherically shaped inner portion, a second spherically shaped inner portion, and a channel connecting the first spherically shaped inner portion with the second spherically shaped inner portion and extending within a depressed area of the outer shell;

the inner shell is spherically shaped and located within the first spherically shaped inner portion;

the second inner shell is spherically shaped and located within the second spherically shaped inner portion; and the channel is sized to prevent the inner shell from leaving the first spherically shaped inner portion and moving into the second spherically shaped inner portion, and the second inner shell from leaving the second spherically shaped inner portion and moving into the first spherically shaped inner portion.

11. The food dispensing pet toy of claim 10 wherein:

the one or more apertures of the inner shell comprises a plurality of apertures; and the one or more apertures of the second inner shell comprises a plurality of apertures.

12. The food dispensing pet toy of claim 11 wherein:

the inner shell is of a same size and shape as the second inner shell.

13. The food dispensing pet toy of claim 11 wherein:

the plurality of apertures of the inner shell are irregularly spaced apart from one another; and the plurality of apertures of the second inner shell are irregularly spaced apart from one another in a same manner as the plurality of apertures of the inner shell.

14. The food dispensing pet toy of claim 1 wherein:

the one or more apertures of the outer shell comprise a plurality of apertures;

the one or more apertures of the inner shell comprise a plurality of apertures.

15. A method of loading kibble into a pet toy for dispensing during play, said method comprising:

providing the food dispensing pet toy of claim 1; and aligning at least one of the one or more apertures of the outer shell with at least one of the one or more apertures of the inner shell, and passing the kibble from outside of the food dispensing pet toy into the innermost void while so aligned.

16. A food dispensing pet toy comprising:

an outer shell defining an inner void and comprising one or more apertures sized to accommodate kibble for passing into the inner void of the outer shell, wherein the outer shell comprises a dumbbell shape such that the inner void defines a first spherically shaped inner portion, a second spherically shaped inner portion, and a channel connecting the first spherically shaped inner portion with the second spherically shaped inner portion and extending within a depressed area of the outer shell; and a first and second inner shell, each being spherically shaped and located within the first and second spherically shaped inner portion, respectively, defining an innermost void, and comprising one or more apertures sized to accommodate the kibble for passing into the innermost void;

wherein the first and inner shells are each detached from the outer shell and freely moveable within the and second spherically shaped inner portion, respectively;

wherein the channel is sized to prevent the first inner shell from leaving the first spherically shaped inner portion and moving into the second spherically shaped inner portion, and the second inner shell from leaving the second spherically shaped inner portion and moving into the first spherically shaped inner portion.

* * * * *